United States Patent
Brunn et al.

(10) Patent No.: US 10,565,272 B2
(45) Date of Patent: Feb. 18, 2020

(54) ADJUSTING SYSTEM ACTIONS, USER PROFILES AND CONTENT IN A SOCIAL NETWORK BASED UPON DETECTED SKIPPED RELATIONSHIPS

(71) Applicant: International Business Machines Corporation, Armonk, NY (US)

(72) Inventors: Jonathan F. Brunn, Salt Lake City, UT (US); Jeffrey R. Hoy, Gibsonia, PA (US); Marit L. Imsdahl, Cary, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 14/923,055

(22) Filed: Oct. 26, 2015

(65) Prior Publication Data
US 2017/0116338 A1 Apr. 27, 2017

(51) Int. Cl.
*G06F 16/9535* (2019.01)
*G06F 16/2457* (2019.01)

(52) U.S. Cl.
CPC .... *G06F 16/9535* (2019.01); *G06F 16/24575* (2019.01)

(58) Field of Classification Search
CPC ......... G06F 17/30867; G06F 17/30528; G06F 15/163; G06F 17/3053; G06F 17/3064; G06F 17/30958; G06F 17/30595; G06F 17/30345; G06F 17/3089; G06F 15/16; G06F 16/9535; G06F 16/24575; H04L 67/306; H04L 65/403; H04L 47/70; H04L 12/1818; H04M 3/565; G06Q 10/06;
(Continued)

(56) References Cited

U.S. PATENT DOCUMENTS 8,055,720 B2  11/2011 He et al.
9,936,243 B2 *  4/2018 Tseng ................. H04N 21/4221
(Continued)

OTHER PUBLICATIONS

Carminati et al., A Semantic Web Based Framework for Social Network Access Control, Jun. 2009, SACMAT'09, all pages.*
(Continued)

*Primary Examiner* — Jay A Morrison
*Assistant Examiner* — Antonio J Caiado
(74) *Attorney, Agent, or Firm* — Scully, Scott, Murphy & Presser, P.C.; L. Jeffrey Kelly (57) ABSTRACT

Adjusting system actions based on an absence of relationship acceptance may include detecting absence of connection acceptance by one or more first users in a computer-implemented social networking system. Patterns of the absence of connection acceptance of the one or more first users may be correlated. Users with common patterns of absence of connection acceptance may be clustered into a cluster of users. Absence of connection acceptance by a second user may be detected. Responsive to determining that a pattern of the absence of connection acceptance associated with the second user matches with the common patterns, a profile associated with the second user may be updated according to a template profile associated with the cluster. System actions of the social networking system may be activated for the second user based on the profile updated according to the template profile.

12 Claims, 6 Drawing Sheets

(58) Field of Classification Search
CPC .... G06Q 10/10; G06Q 10/1095; G06Q 99/00; G06Q 30/02; G06Q 50/01
USPC ........ 707/740, 748, 758, 798, E17.011, 731, 707/751, E17.009, E17.016; 709/204
See application file for complete search history.

(56) References Cited

U.S. PATENT DOCUMENTS

| | | | | |
|---|---|---|---|---|
| 2003/0050977 | A1* | 3/2003 | Puthenkulam | H04L 67/104 709/204 |
| 2004/0148275 | A1* | 7/2004 | Achlioptas | G06F 17/30867 |
| 2005/0021750 | A1* | 1/2005 | Abrams | G06Q 10/10 709/225 |
| 2009/0319288 | A1* | 12/2009 | Slaney | G06Q 10/10 705/1.1 |
| 2010/0169340 | A1* | 7/2010 | Kenedy | G06Q 30/02 707/758 |
| 2010/0192068 | A1* | 7/2010 | Wineinger | G06F 17/30905 715/744 |
| 2011/0246574 | A1* | 10/2011 | Lento | G06Q 10/10 709/204 |
| 2011/0313833 | A1 | 12/2011 | Graepel et al. | |
| 2012/0011212 | A1 | 1/2012 | He et al. | |
| 2012/0101970 | A1* | 4/2012 | Zernik | G06Q 10/10 706/45 |
| 2012/0143921 | A1* | 6/2012 | Wilson | G06Q 50/01 707/798 |
| 2013/0031181 | A1* | 1/2013 | Eberstadt | G06Q 10/10 709/204 |
| 2013/0073568 | A1* | 3/2013 | Federov | G06F 17/30867 707/749 |
| 2013/0191416 | A1* | 7/2013 | Lee | G06F 17/30979 707/771 |
| 2013/0290091 | A1* | 10/2013 | Benyamin | G06Q 30/0269 705/14.41 |
| 2013/0304830 | A1* | 11/2013 | Olsen | H04L 51/32 709/206 |
| 2013/0339432 | A1* | 12/2013 | Kadashevich | G06Q 50/01 709/204 |
| 2014/0053087 | A1 | 2/2014 | Xiong et al. | |
| 2014/0082089 | A1* | 3/2014 | Liew | H04L 65/403 709/204 |
| 2014/0189539 | A1* | 7/2014 | St. Clair | G06F 3/048 715/753 |
| 2014/0282114 | A1* | 9/2014 | Walkin | H04L 51/32 715/758 |
| 2015/0039695 | A1 | 2/2015 | Lento et al. | |
| 2015/0242424 | A1* | 8/2015 | Godsey | G06F 17/3089 707/689 |
| 2016/0014134 | A1* | 1/2016 | Holson | H04L 67/306 726/4 |
| 2016/0249190 | A1* | 8/2016 | Shaw | H04W 4/21 |
| 2016/0321258 | A1* | 11/2016 | Brunn | G06F 16/9535 |
| 2017/0053033 | A1* | 2/2017 | Wookey | H04L 51/32 |
| 2017/0061016 | A1* | 3/2017 | Lytkin | G06F 17/30867 |
| 2017/0178023 | A1* | 6/2017 | Green | G06N 99/005 |
| 2018/0027268 | A1* | 1/2018 | Cheng | G06T 5/50 375/240.26 |

OTHER PUBLICATIONS

Cheng, Access Control for Online Social Networks Using RelationshipTypePatterns, May 2014, UTSA, all pages.*
Cheng et al., An Access Control Model for Online Social Networks Using User-to-User Relationships, 2015, IEEE, all pages.*
Moffitt et al., Collaborative Access Control in WebdamLog, Mar. 2015, Hal archives-ouvertes.fr, all pages.*
Merriam-Webster Dictionary, Definition of first, 1828, all pages.*
Masoumzadeh et al., Ontology-based access control for social network Systems, Jan. 2011, Int. J. Information Privacy, Security and Integrity, vol. 1. all pages.*
Donath, Signals in Social Supernets, 2007, Journal of Computer Mediated Communication, MIT, All pages.*
Donath, Social Network Sites Definition, History, and Scholarship, Journal of Computer Mediated Communication, University of California Berkeley, 2007, all pages.*

* cited by examiner

WE HAVE NOTICED THAT YOU HAVE NOT YET CONNECTED WITH USER A.

WOULD YOU SAY THE REASON IS:
- "I DON'T CONNECT WITH WORK COLLEAGUES"
- "I PREFER NOT TO CONNECT ON THIS NETWORK"
- "LACK OF COMMON INTERESTS"
- "HAVEN'T GOTTEN AROUND TO IT" (SKIP DETECTOR ERROR)
- "I DON'T KNOW THAT PERSON" (RECOMMENDATION ERROR)
- OTHER (NETWORK DID NOT LIST LIKELY REASON ABOVE)
- RATHER NOT SAY (PRIVACY OPT-OUT)

ADJUSTING SYSTEM ACTIONS, USER PROFILES AND CONTENT IN A SOCIAL NETWORK BASED UPON DETECTED SKIPPED RELATIONSHIPS

FIELD

The present application relates generally to computers and computer applications, and more particularly to social networking services and adjusting social networking system actions based on skipped relationships.

BACKGROUND

Social networking platforms or services allow user to communicate via a computer network, for example, in an online community, for example, to share interests and activities. A user of a social networking platform may create a profile that may include the information about the user, a list of one or more users designated as friends or connections for sharing online activities and others. Social networking applications that provide social networking services now include a capability to recommend or suggest other users with whom a user may like to connect. For instance, when a user opens a browser or like user interface to activate a social networking service, the social networking service may look up other users who are participants of the social networking service who may have various commonalities with the user or those who have indirect connections with the user, for suggesting a connection or relationship.

BRIEF SUMMARY

A computer-implemented method and system of adjusting system actions based on an absence of relationship acceptance, may be provided. The method, in one aspect, may include detecting an absence of connection acceptance by one or more first users in a computer-implemented social networking system. The method may also include correlating patterns of the absence of connection acceptance of the one or more first users. The method may further include clustering users with common patterns of absence of connection acceptance into a cluster of users. The method may also include detecting an absence of connection acceptance by a second user. The method may also include, responsive to determining that a pattern of the absence of connection acceptance associated with the second user matches with the common patterns, updating a profile associated with the second user according to a template profile associated with the cluster. The method may also include activating system actions of the social networking system for the second user based on the profile updated according to the template profile.

A system for adjusting system actions based on an absence of relationship acceptance, in one aspect, may include a storage device and one or more processors communicatively coupled to the storage device. One or more of the processors may be operable to detect an absence of connection acceptance by one or more first users in a computer-implemented social networking system. One or more of the processors may be further operable to correlate patterns of the absence of connection acceptance of the one or more first users. One or more of the processors may be further operable to cluster users with common patterns of absence of connection acceptance into a cluster of users. One or more of the processors may be further operable to detect an absence of connection acceptance by a second user. Responsive to determining that a pattern of the absence of connection acceptance associated with the second user matches with the common patterns, one or more of the processors may be further operable to update a profile associated with the second user according to a template profile associated with the cluster. One or more of the processors may be further operable to activate system actions of the social networking system for the second user based on the profile updated according to the template profile.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System and methods may be provided that improve the online social network platform or server, e.g., executing on one or more hardware processors, by assessing or determining one or more reasons or information as to why users do not connect to other users, for example, even after repeated recommendations or suggestions by the social network. In one aspect, techniques are presented that correlate users in a social network in a computer-implemented communities based on non-explicit avoidance of relationships.

In a social network, there are cases when two users close to one another do not make a connection. In a simple example, two classmates may choose to not "friend" one another on a social network. When this situation arises, social networks lack context to know whether the user will later connect with one another. There may be various reasons for not connecting. For example, a user may choose to use one social network for business relationships and another for personal relationships, and do not mix the two groups. As another example, a user may choose to skip creating digital relationships with people that they already interact with on a daily basis to minimize the number of communication channels.

For example, a personal social network may have a group of users who all know one another in real life. This group of users may be very similar characteristics and connections as indicated by their social network profiles according to an automated analytics performed on the social network users. However, a number of users in the group may remain disconnected and persistently skip suggestions to connect with other users.

For a potential connection that the social network rates as a good suggestion, if those users fail to connect after repeated suggestions, knowing the reason they are not connecting would be valuable, for example, to the social network provider or developer, in providing recommendations and content to those users.

Figure 1:
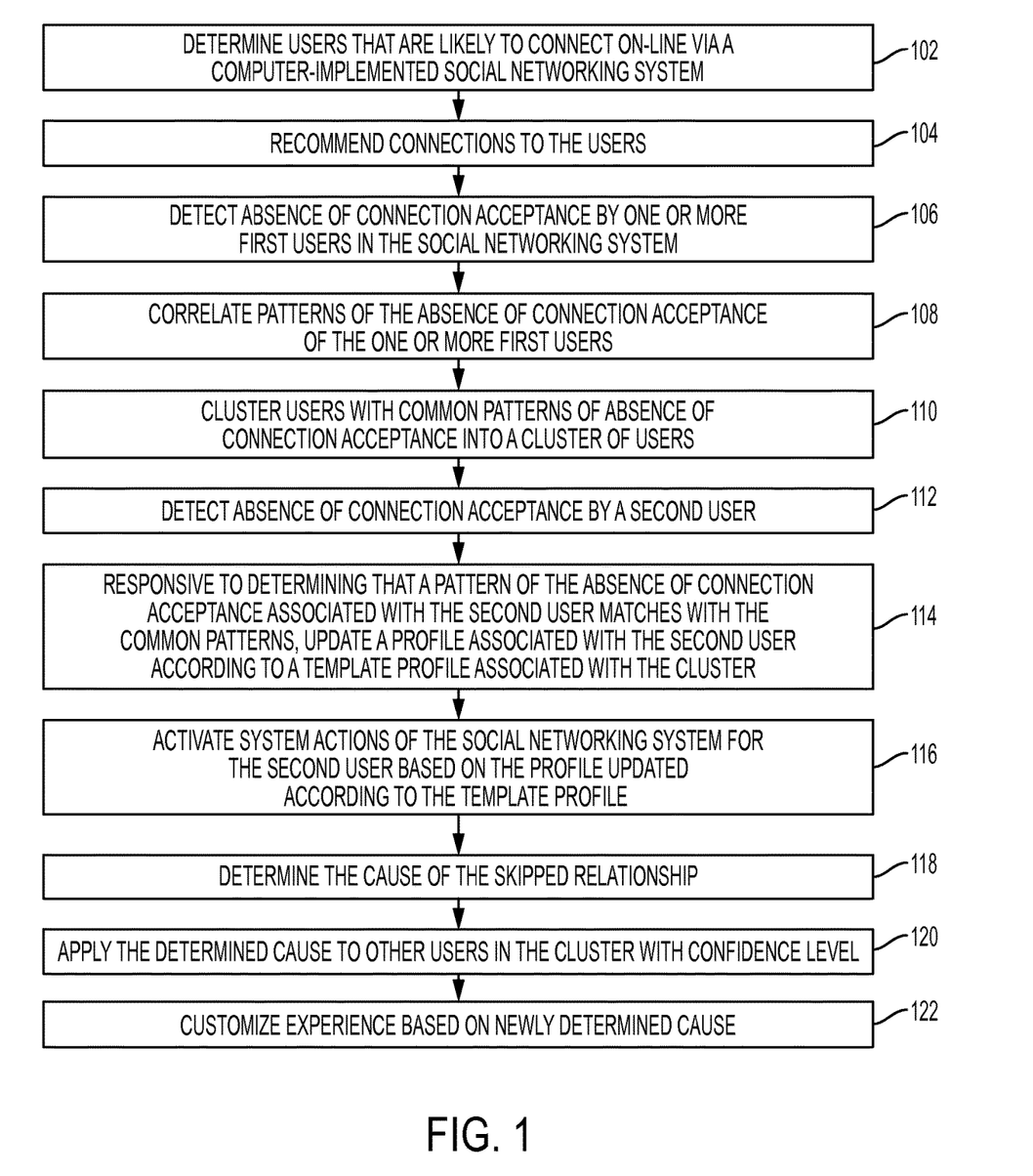
FIG. 1 is a flow diagram illustrating an overview of a method in one embodiment of the present disclosure.

FIG. 1 is a flow diagram illustrating an overview of a method in one embodiment of the present disclosure. At 102, a social network application or platform, for example, running on one or more hardware processors such as a central processing unit (CPU) or another processor, performs analytics to determine that two users are likely to connect. Existing analytics may be used to perform such analysis. Information about the users, for example, user profiles may be stored in a database of users, on a storage device communicatively coupled to the one or more hardware processors.

At 104, the social network application recommends these connections to the two users, for example, by presenting a notification on a user interface display associated with the social network application. For example, a user's device may open a browser or the like user interface for allowing the user to interact with the social network application and communicate online with connected users or "friends" or the like.

At 106, the social network detects that users (e.g., one or more first users) are intentionally skipping the relationship. Whether the social network users are intentionally not connecting may be determined, for example, using a methodology disclosed in a co-pending co-owned patent application, U.S. patent application Ser. No. 14/698,033 entitled "LEVERAGING SKIPPED RELATIONSHIPS IN A SOCIAL NETWORK," incorporated herein in its entirety, or using another method. For example, if a user does not connect despite repeated recommendations to connect, it may be determined that the user is intentionally skipping the connection.

At 108, the social network application or platform correlates the user skip pattern (pattern of absence of connection acceptance) with other users who have similar skip patterns.

At 110, the social network application clusters users with common skip patterns. For example, skip patterns of users may be stored by the social network application and the patterns analyzed to identify those users having matching skip patterns. Matching in this disclosure need not match identically. Rather, a match may be found if one user has a pattern that matches a threshold percentage (e.g., 80% or another) or amount of pattern with another user.

At 112, the social network application may detect that another user (e.g., a second user) is skipping connection recommendations. When another user (e.g., a second user), e.g., User Z, starts making the same skip patterns, the social network application uses profiles of other users in the cluster as profile templates for User Z. For example, at 114, responsive to determining that a pattern of the absence of connection acceptance associated with User Z matches with the common skip patterns, User Z's profile may be updated according to a template profile associated with the cluster. A template profile associated with the cluster, e.g., may be built to include common profiles of the users in the cluster.

At 116, the social network application customizes experience for User Z based on new correlations. For instance, social networking system actions may be activated for the second user based on the profile updated according to the template profile, such as: updating user recommendations, displaying content, recommending groups, etc.

At 118, the social network application may determine the cause of the skipped relationship.

At 120, the social network application may apply the determined cause to other users in the cluster with confidence based on their cluster membership strength.

At 122, the social network application may customize experience based on newly determined cause. For instance, if the determined reason for not connecting is that a user does not mix professional connections and personal connections, the social network application may refrain from recommending a work colleague for relationship in a personal social network, and vice verse.

In one embodiment, the system and method of the present disclosure correlates users based on evidence of avoidance of relationships; customizes displayed content, recommendations, and other capabilities based on the newly correlated users; determines the cause of skipped relationships; customizes displayed content, recommendations, and other capabilities for correlated users based specifically upon determined cause; provides confidence based on graph interconnectedness; and eliminates outliers based on likely cause of connection.

Figure 2:
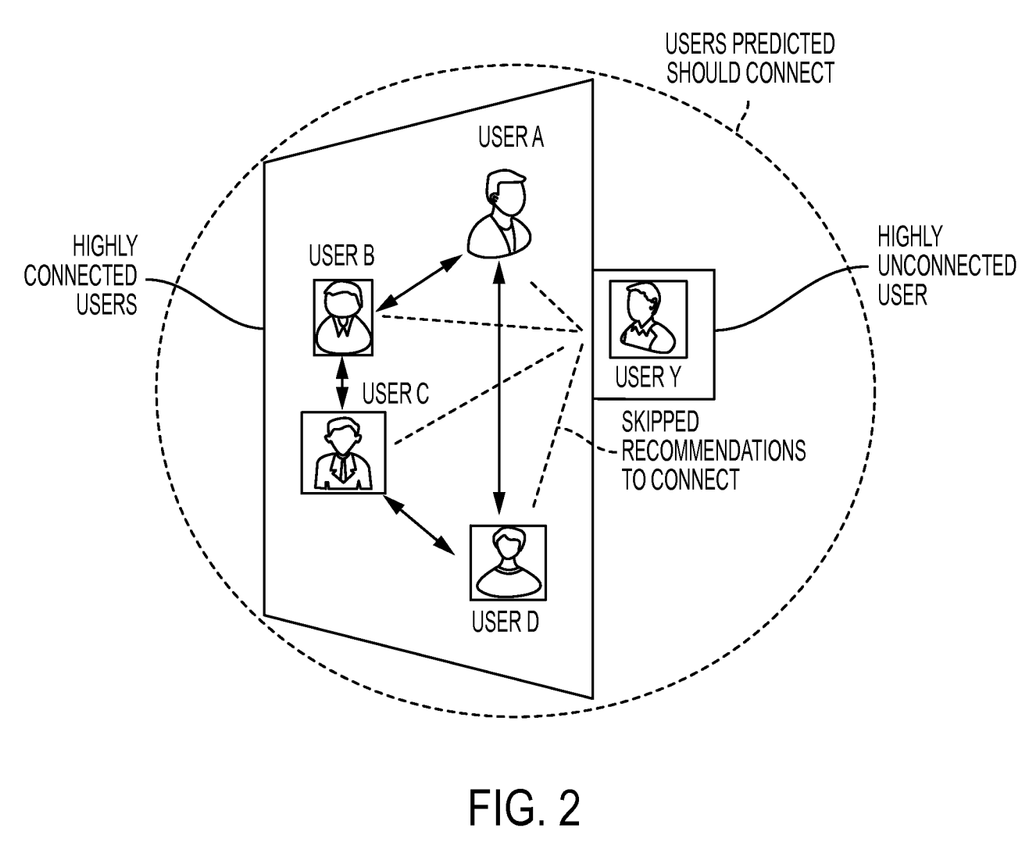
FIG. 2 is a diagram showing an example of a methodology in one embodiment of the present disclosure.

FIG. 2 is a diagram showing an example of a methodology in one embodiment of the present disclosure. Six users (e.g., User A, User B, User C, User D, User Y, User Z) work together at Acme Company and are friends with one another. They frequently email one another, and they have a highly connected network graph within Acme Co's internal social network.

On a personal social network four users (User A, User B, User C, User D) routinely connect with business contacts on the personal network. However User Y prefers not to connect with business associates on their personal network, even when they are good friends. The personal social network is able to determine that User Y should connect with User A, User B, User C, User D, and frequently recommends that User Y connects with his associates. The social network application can make this determination in multiple ways, for example, based on existing capabilities.

For example, a personal social network application may pull in a business contact email list. The personal social network application may correlate other users that these five contacts have in common. The personal social network may correlate similarities between the users, such as working for the same company in the same location. The personal social network application may extrapolate a hierarchy of Acme Company. The personal social network application may generate recommendations with particular confidence values. The social network application may then begin building up evidence that User Y is intentionally skipping relationships with his associates, resulting in the example network graph shown in FIG. 2. For example, despite a number of recommendations to User Y to connect to Users A, B, C and D, User Y still does not connect. The dashed lines show skipped recommendations to connect.

Figure 3:
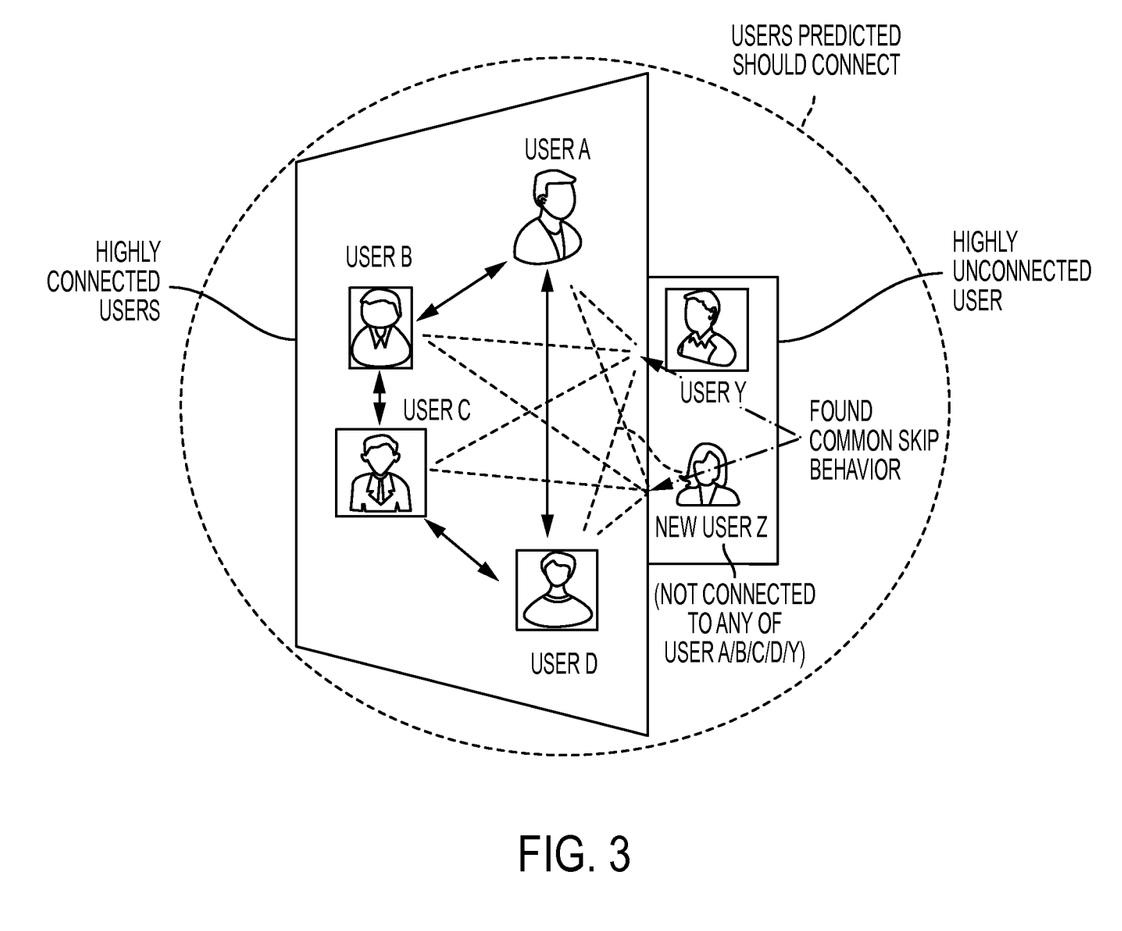
FIG. 3 shows a diagram illustrating a graph of social network users with connections and skipped connections in one embodiment of the present disclosure.

User Z later joins the personal social network as a new user. The social network application makes a determination that User Z should connect with users A, B, C, D and Y with a recommendation confidence. Like User Y, User Z does not want to connect with her work friends on the personal network. New User Z skips opportunities to connect with users A, B, C, D and Y. FIG. 3 shows a diagram illustrating a graph of social network users with connections and skipped connections in one embodiment of the present disclosure.

The social network application in one embodiment may correlate behavior of skipped relationship and identify a similarity between users Y and Z. At this point the social network application may not know the reason Users Y and Z are skipping relationships, but the social network application may make use of this information by correlating profiles. For example, the social network application in one embodiment may deprioritize connection recommendations to User Z based on other users that User Y has intentionally skipped. If User Y has disabled communication from Acme Company on the personal social network, the social network application in one embodiment may deprioritize that content for User Z. The social network application in one embodiment may weight the profile correlation of User Y more highly than Users A, B, C, D, for example in suggesting groups to join and content to view. The social network application in one embodiment may cluster the profiles of Users Y and Z, and other future users with similar recommendation skip patterns, to further strengthen similarities.

The social network in one embodiment of the present disclosure may also determine or identify a cause for the skipped relationship. For example, it may be determined as to whether the users avoid certain types of relationships on certain networks; The users know one another, but they have a relationship that does not apply to the domain of the social network (such as not being friends, on a network of friends); The users avoid making connections based on a profile aspect, such as common interests, other connections, company, location, etc.

In one aspect, the cause of users skipping relationships may be determined by presenting a free form entry and requesting a user to enter the reason.

Figure 4:
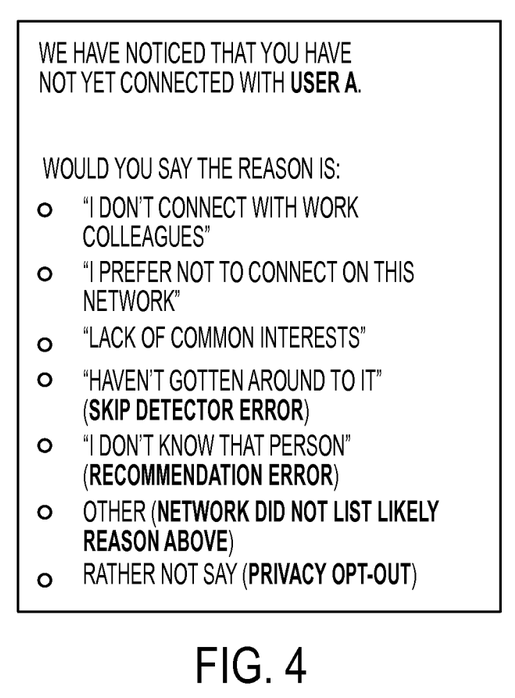
FIG. 4 shows an example display provided to a user for determining a plurality of reasons and asking a user to confirm the reason in one embodiment of the present disclosure.

In another aspect, the cause of users skipping relationships may be determined, for example, by an application running on a processor, which correlates the user profile and skip patterns to other known causes of users skipping relationships. An example display provided to a user is shown in FIG. 4 for determining a plurality of reasons and asking a user to confirm the reason. The display may be provided on a computer user interface.

For instance, analytics may be employed to determine the profile characteristic that the user is avoiding, such as company or location or interests. A set of known causes may be pre-programmed into the social network application. An analytics threshold may also be pre-programmed to indicate when a user falls into such a category. This option may be particularly relevant to networks that are used for a specific purpose, where a threshold can be added to make a determination when users would not connect within the domain of the network. For example, for a network based on geographic location, the threshold would be based on distance between users to make a determination if a particular user connects only with nearby users.

Thus, in one embodiment, the social network application may identify the cause that the user is skipping relationship. Further, the social network application may utilize this information in several ways. For example, the social network application may determine applicability of the cause to other users in the cluster of users of the social network. For example, for users skipping connections with work colleagues, the social network application may check other users in the cluster and determine if those users have skipped work colleagues. The social network application may then add or remove users from the cluster based on this known cause.

As another example, the social network application may update network recommendations based on the known (identified) cause. For example, the social network application may stop recommending work colleagues.

As yet another example, the social network application may reprioritize content and other recommendations in the system based on the known (identified) cause, where applicable.

Still as another example, the social network application may apply the identified cause to other users in the cluster, and reprioritize content and other recommendations in the system based on the known (identified) cause.

As another example, the social network application may use the determined cause to perform a more targeted determination from other users in the cluster. For example, the social network application may further explicitly ask the user, "Is the reason you have not connected with User A due to the work relationship?—Yes.—No." The user confirmed response then may be stored as the cause.

The social network application may also add the identified cause information to the user's implicit profile, to make use in existing profile-based analytics.

The social network application may also ask other users to update profiles with specific determined information. For example, in the example above, if User Z had not yet listed their company as Acme Co., the clustering would indicate User Z is working at Acme Co. and the social network application may ask a targeted question such as: "Profile update: do you work at Acme Co.?" User Z's response may be used to update User Z's profile.

In one embodiment, the determined cause need not be acted on immediately. For example, the social network application may construct a bucket of users that fit a particular category and features and network changes may be implemented based on that cause. For example, if today a social network has 10 users that do not interact with work colleagues, but later that number becomes 100,000, at that point the social network application may take steps to improve the experience for those users. In the meantime, knowing which causes have arisen is still valuable information to prioritize development effort.

In one aspect, the social network's user connectedness may not always be configured such that one group of users are fully connected and another group fully disjoint. In the example above, even if User Y avoids making contact with work colleagues, User Y may have connectivity to the other users for example through family relations or a community group. In these cases the social network application may determine a confidence estimate based on the social network, where a user may be avoiding connecting to a set of users, with a likelihood level. The estimated confidence can be used to affect the social network with strength based on the confidence. For example, if User Y and User Z show similar behavior in skipped relationships, but the system (or the social network application) is only 60% confident that user Z matches the behavior of User Y, then the system can apply a 60% profile weight match rather than a direct correlation to the other profile. As a result, for example, the predicted skipped relationships may be deprioritized as suggestions but not fully eliminated as suggestions.

Figure 5:
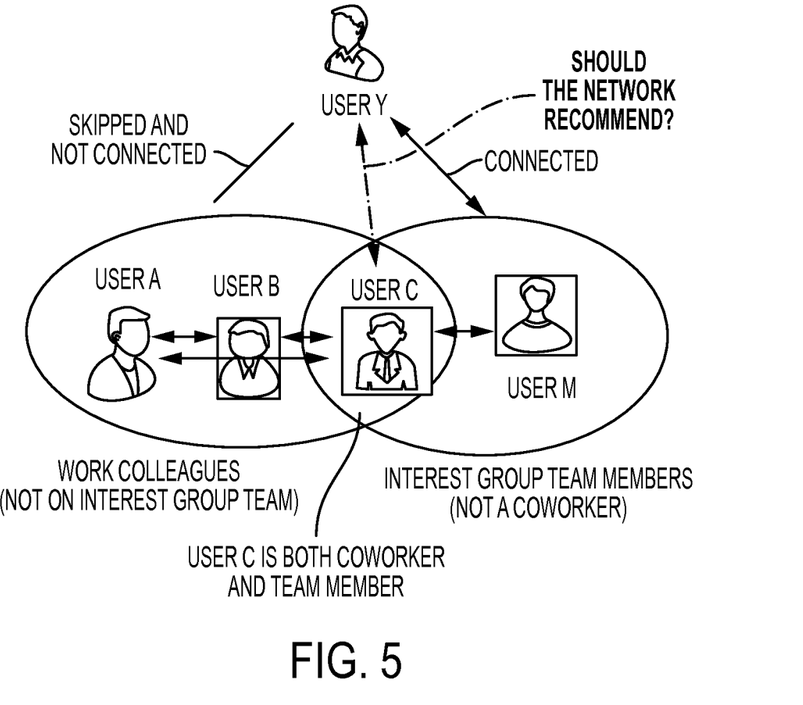
FIG. 5 illustrates different groups of users depicting an example scenario in one embodiment of the present disclosure.

FIG. 5 illustrates different groups of users depicting this example scenario in one embodiment of the present disclosure. In the example shown, User C is both co-worker and an interest group team member. User C's team membership can override or partially override predicted skipped relationship. A formed connection with User C does not mean User Y stopped connecting with work colleagues.

Determining the cause of a connection is also valuable in "cleaning up" the social network graph. For example a community group may go on a retreat, and all those members may connect with one another during the retreat. If the connection breaks one of the previously identified skipped relationships, the connection may be considered an outlier from the user's normal behavior. In this case, the connection may be discarded from the profile matching.

In one aspect, the following type of connection behavior may be detected and analyzed: temporal aspects, such as a group of users connecting at the same time; relationship aspects, such as a user connecting through another user known to be part of a group (e.g., an interest group) outside the source of the user's skipped behavior (e.g., work colleagues). Connections in the group can be analyzed with respect to these aspects to identify outliers and raise confidence of a user's skipped relationship behavior. For instance, the users who do not fit the type of connection behavior, such as those who do not fit into the temporal aspect or the another relationship aspect, would be considered outliers.

In addition, the outliers can be used as examples where the user does not skip relationships, which can further enhance a recommendation engine, for example, of the social network application, by refining the set of users likely to connect with, with the set of users likely to be skipped. For instance, once the outliers are identified and also analyzed to assess the reason why the user skipped relationships, the recommendation engine can be refined by using these reasons to understand the set of users that the user may want or not want to connect with.

In one aspect, a method for adjusting system actions may be based on an absence of relationship acceptance attributed to a cause or reason to form a classification of a pattern of activity. For example, an absence of relationship acceptance between users may be analyzed against a set of social connection aspects in a social networking system. Responsive to determining that an absence of relationship acceptance between a first set of users and a second set of users with a first social connection aspect exceeds a predetermined threshold, profiles of the first set of users and the second set of users with the first social connection aspect may be updated by the social networking system. Social content may be tailored to the first set of users and the second set of users based on the first social connection aspect. The set of social connection aspects may include one or more of business contact relationship, location, common interest, another community connection, demography, and others. The set of social connection aspects may be determined by natural language processing (NLP) and analytic analysis of communications and profiles of the first set of users and the second set of users. The set of social connection aspects may be determined by the social networking system interacting with the first set of users and the second set of users. The tailoring social content may include adjusting or tuning algorithms that process contact requests, information content postings, and contact relationship, and others.

Figure 6:
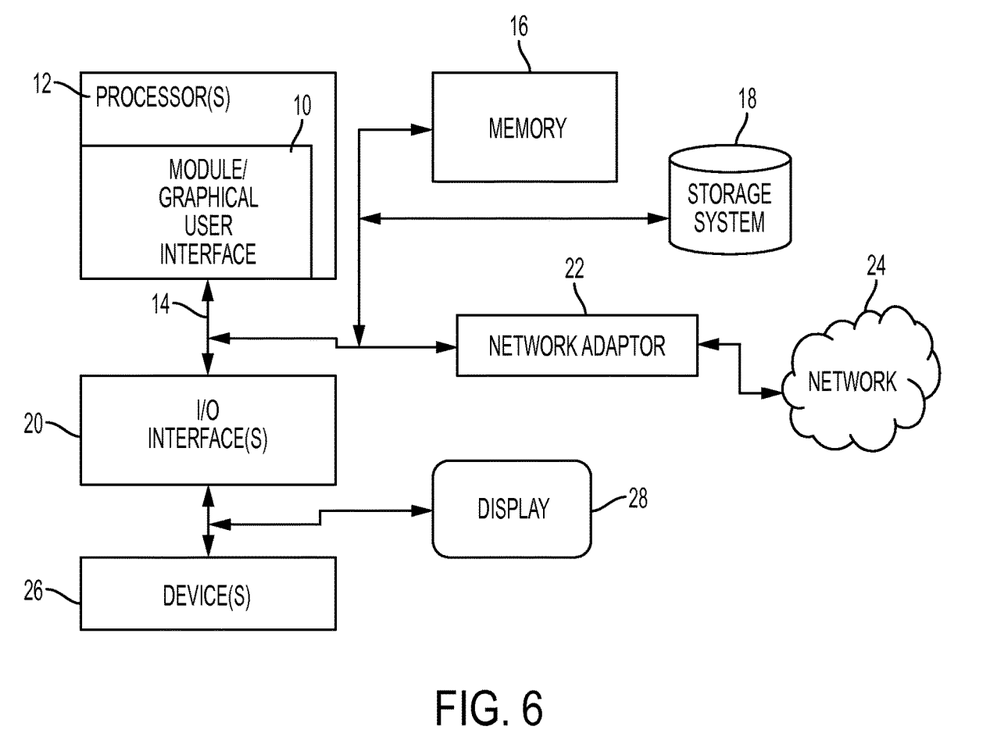
FIG. 6 illustrates a schematic of an example computer or processing system that may implement a system that adjusts social networking system actions based on skipped relationships in one embodiment of the present disclosure.

FIG. 6 illustrates a schematic of an example computer or processing system that may implement a system that adjusts social networking system actions based on skipped relationships in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of adjusting a system action based on an absence of relationship acceptance, the method executed automatically by a social network application running on a hardware processor, the method comprising:

detecting absence of connection acceptance by a plurality of users in a computer-implemented social networking system despite repeated recommendations by the social network application to connect;

correlating patterns of the absence of connection acceptance of the plurality of users;

clustering the plurality of users with common patterns of absence of connection acceptance into a cluster of users;

detecting absence of connection acceptance by another user, wherein said another user is a different user from the plurality of users;

responsive to determining that a pattern of the absence of connection acceptance associated with said another user matches with the common patterns of the absence of connection acceptance by the plurality of users, updating a profile associated with said another user according to a template profile associated with the cluster, the template profile generated to include a profile common among the plurality of users belonging to the cluster;

activating a system action of the social networking system for said another user based on the profile updated according to the template profile; and determining a cause of a skipped relationship, wherein the system action comprises at least updating a set of users likely to connect with and a set of users likely to be skipped based on the determined cause.

2. The method of claim 1, wherein the system action comprises recommending connections and causing displaying of customized content.

3. The method of claim 1, further comprising applying the cause to the users in the cluster.

4. The method of claim 1, further comprising modifying the system action based on the cause.

5. A computer program product comprising a computer readable storage medium having program instructions embodied therewith, the program instructions executable by a device to cause the device to:

detect absence of connection acceptance by a plurality of users in a computer-implemented social networking system despite repeated recommendations by the social network application to connect;

correlate patterns of the absence of connection acceptance of the plurality of users;

cluster the plurality of users with common patterns of absence of connection acceptance into a cluster of users;

detect absence of connection acceptance by another user, wherein said another user is a different user from the plurality of users;

responsive to determining that a pattern of the absence of connection acceptance associated with said another user matches with the common patterns of the absence of connection acceptance by the plurality of users, updating a profile associated with said another user according to a template profile associated with the cluster, the template profile generated to include a profile common among the plurality of users belonging to the cluster;

activate a system action of the social networking system for said another user based on the profile updated according to the template profile; and determine a cause of a skipped relationship, wherein the system action comprises at least updating a set of users likely to connect with and a set of users likely to be skipped based on the determined cause.

6. The computer program product of claim 5, wherein the system action comprises recommending connections and causing displaying of customized content.

7. The computer program product of claim 5, further comprising applying the cause to the users in the cluster.

8. The computer program product of claim 5, further comprising modifying the system action based on the cause.

9. A system for adjusting a system action based on an absence of relationship acceptance, comprising:

a storage device; and a processor communicatively coupled to the storage device, the processor running a social network application operable to detect absence of connection acceptance by a plurality of users in a computer-implemented social networking system despite repeated recommendations by the social network application to connect, the processor further operable to correlate patterns of the absence of connection acceptance of the plurality of users, the processor further operable to cluster the plurality of users with common patterns of absence of connection acceptance into a cluster of users, the processor further operable to detect absence of connection acceptance by another user, wherein said another user is a different user from the plurality of users, responsive to determining that a pattern of the absence of connection acceptance associated with said another user matches with the common patterns of the absence of connection acceptance by the plurality of users, the processor further operable to update a profile associated with said another user according to a template profile associated with the cluster, the template profile generated to include a profile common among the plurality of users belonging to the cluster, the processor further operable to activate a system action of the social networking system for said another user based on the profile updated according to the template profile, the processor further operable to determine a cause of a skipped relationship, wherein the system action comprises at least updating a set of users likely to connect with and a set of users likely to be skipped based on the determined cause.

10. The system of claim 9, wherein the system action comprises recommending connections and causing displaying of customized content.

11. The system of claim 9, wherein the processor is further operable to apply the cause to the users in the cluster.

12. The system of claim 9, wherein the processor is further operable to modify the system action based on the cause.

* * * * *